United States Patent [19]

Black

[11] Patent Number: 4,723,274

[45] Date of Patent: Feb. 2, 1988

[54] ARRANGEMENT FOR TRANSFERRING DATA TO AN ATTENDANT CONSOLE

[75] Inventor: James B. Black, Phoenix, Ariz.

[73] Assignee: GTE Communication Systems, Phoenix, Ariz.

[21] Appl. No.: 813,185

[22] Filed: Dec. 24, 1985

[51] Int. Cl.[4] ............................................. H04M 3/42
[52] U.S. Cl. ..................................... 379/242; 379/267
[58] Field of Search ............... 379/242, 220, 221, 229, 379/230, 231, 232, 233, 234, 267

[56] References Cited

U.S. PATENT DOCUMENTS 4,160,129 7/1979 Peyser et al. ........................ 379/220

*Primary Examiner*—James L. Dwyer
*Attorney, Agent, or Firm*—Anthony Miologos; Peter Xiahros

[57] ABSTRACT

An arrangement for transmitting data messages between a CENTREX equipped central office exchange and a remotely located attendant console. The arrangement includes an operating unit residing in an interface circuit connected between the CENTREX and the attendant console. The operating unit includes sequential memory connected to the CENTREX and to a controller arranged to receive and store data message from the CENTREX. The CENTREX sends a data available signal to the controller signaling that a data message is available for transfer from the sequential memory. In response, the controller sends the CENTREX a sequential memory read control signal signaling that the controller is reading the sequential memory. State machine called by the controller transfers a first byte of the data message from the sequential memory to temporary memory. The state machine accepts all additional characters from the sequential memory and stores the characters in the temporary memory until an end of data message character sequence is received. An analysis is then called by the controller which ascertains the data messages destination. Sending circuitry connected to the attendant console and to the controller transmits the data message to the attendant console. The transmission of the data messages is terminated by the controller by resetting the sequential memory read control signal in response to the CENTREX resetting the data available signal. This signals the CENTREX that the transmission is complete.

10 Claims, 7 Drawing Figures

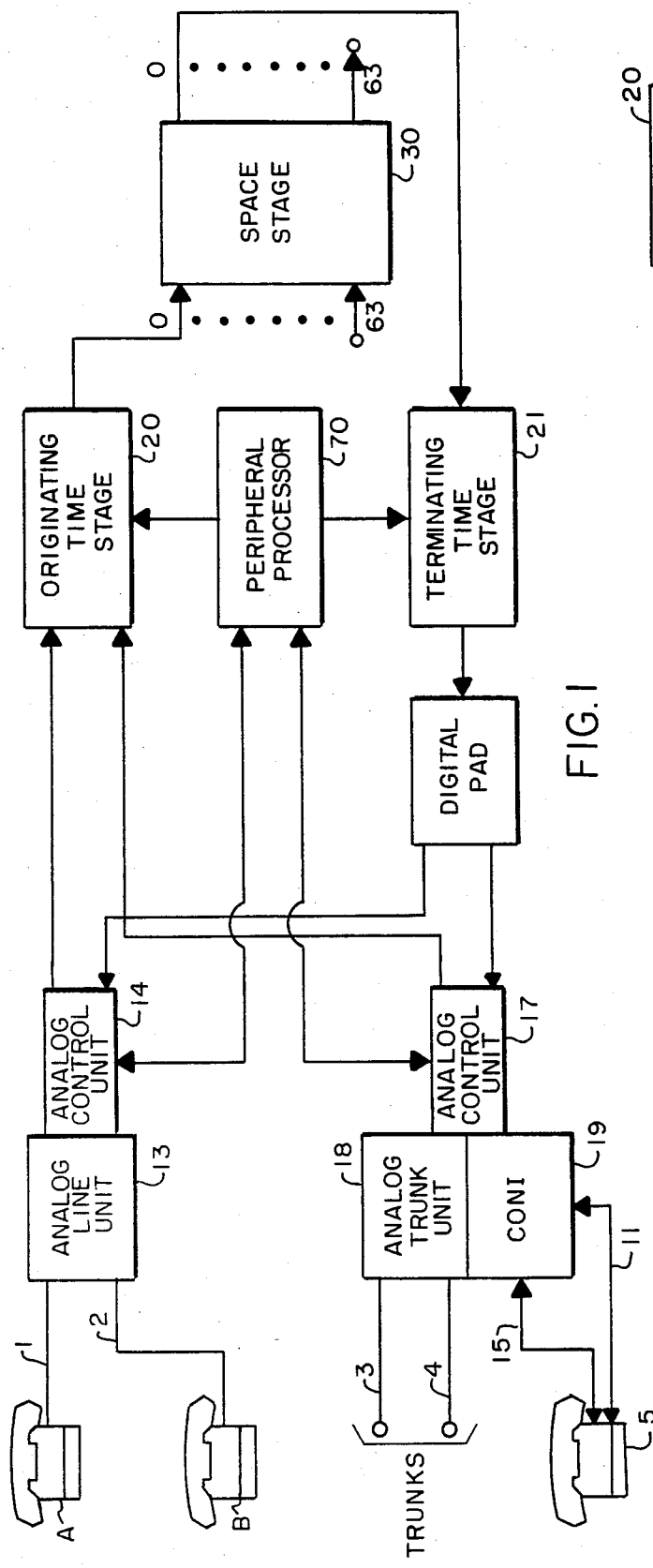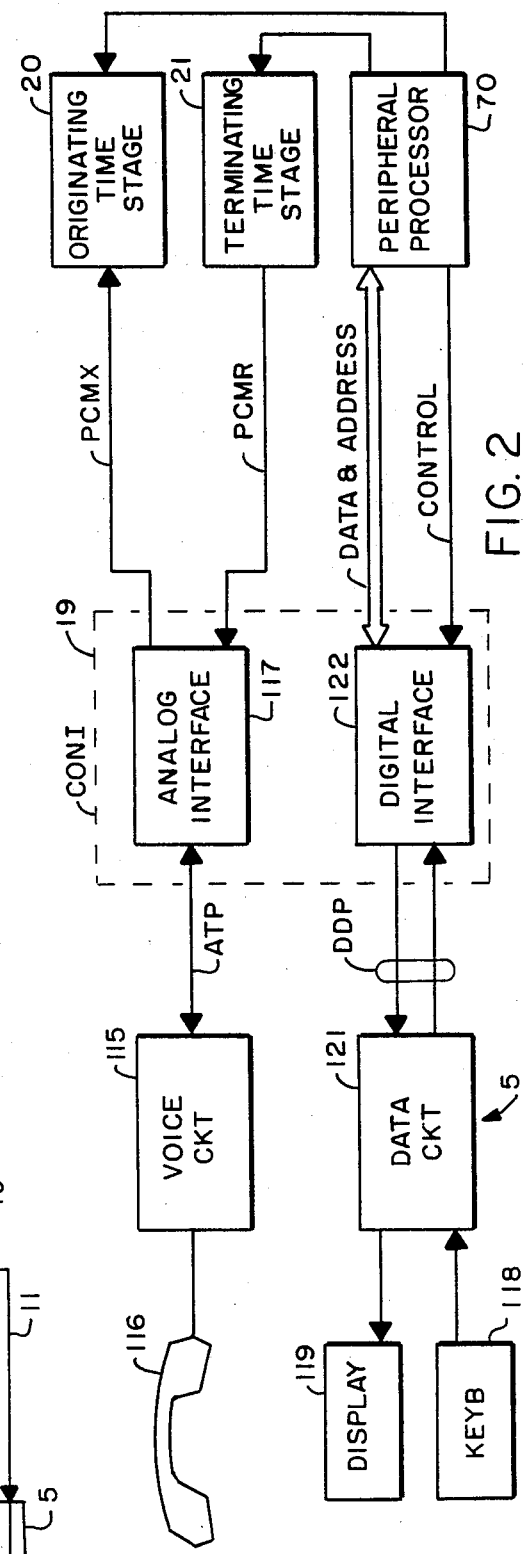

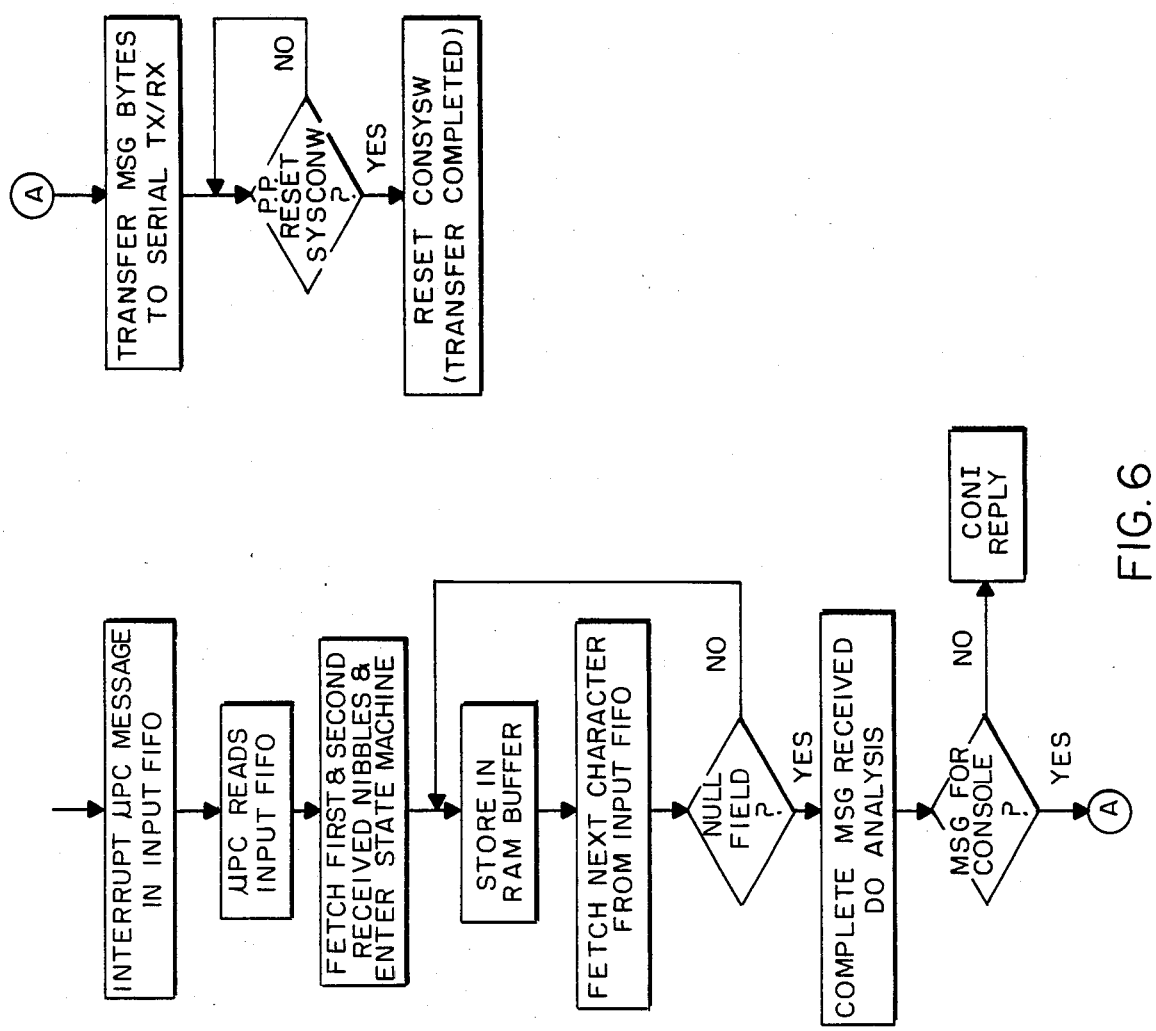

ARRANGEMENT FOR TRANSFERRING DATA TO AN ATTENDANT CONSOLE

CROSS-REFERENCE TO RELATED APPLICATIONS

The present application is related to the following co-pending U.S. patent applications all having the same inventive entity and being assigned to the same assignee:

U.S. Ser. No. 813,322, titled, "A CENTREX ATTENDANT CONSOLE INTERFACE;"

U.S. Ser. No. 813,188, titled, "AN INTERFACE CIRCUIT FOR TRANSMITTING KEYCODES TO A CENTREX;"

U.S. Ser. No. 813,187, titled, "AN INTERFACE CIRCUIT FOR TRANSMITTING COMMAND CODES TO AN ATTENDANT CONSOLE;"

U.S. Ser. No. 813,321, titled, "CONTROL CIRCUIT FOR A CENTREX ATTENDANT CONSOLE INTERFACE;"

U.S. Ser. No. 813,186, titled, "AN ARRANGEMENT FOR TRANSFERRING DATA TO A CENTREX;"

U.S. Ser. No. 813,176, titled, "AN ARRANGEMENT FOR INITIALIZING A CENTREX CONSOLE INTERFACE CIRCUIT."

BACKGROUND OF THE INVENTION

The present invention relates in general to telecommunication switching systems and more particularly to an interface linking voice and data communications between a CENTREX equipped central office exchange and an attendant console.

Private Branch Exchanges (PBX) are telecommunication systems which provide communication services to customers having a plurality a subscriber instruments. The PBX equipment provides a host of enhanced features such as call forwarding, intercom functions, least cost routing of calls and detailed billing. Normally the PBX is purchased by the customer and installed on premises at his location. Therefore, since the PBX handles a first level of switching among the subscriber instruments fewer central office lines are required and therefore access charges are lower. However, this savings is offset by the initial cost of the PBX equipment.

An alternative to the classical PBX is being offered in the Telecommunication market today which provides all of the features of a PBX without any of the initial costs. This system known in the field as CENTREX (central exchange) allows either a portion of a central office network switching system or a dedicated CENTREX central office network switching system to function and provide the services and features as would a dedicated PBX. The customers subscriber instruments are connected directly to the CO switch or concentrated with a multiplexing device and connected via trunk lines. The telephone operating company providing the service would service the switch therefore, alleviating the customer of maintaining his own equipment. Of course access charges are somewhat higher with the CENTREX than those with the on premises PBX equipment.

Usually PBX equipment includes an attendant console which monitors the PBX, i.e. lines or trunks in use, and provide a means of selecting or deselecting features and services as well as a system status display. Additionally, the console can also serve as a central operator station providing for attendant call handling. Such consoles are also used with CENTREX systems to provide the features discussed above.

It therefore becomes the object of the present invention to provide a console interface circuit to link an attendant console normally located at the customer premises with a CENTREX network system located at a telephone operating companies central office.

SUMMARY OF THE INVENTION

In accomplishing the object of the present invention there is provided an operating unit for an interface circuit for transmitting data messages between a CENTREX equipped central office exchange and a remotely located attendant console. The central office exchange includes an analog control unit connected to a peripheral processor. The analog control unit includes a control field for sending control signals to the interface circuit and a sense field for receiving control signals from the interface circuit and sending data messages to the interface circuit.

The operating unit of the present invention comprises sequential memory means connected to the sense field and to controller means. The sequential memory means is arranged to receive and store a data message from the peripheral processor. The peripheral processor sends a data available signal to the controller means via the control field, signaling that a data message is available for transfer from the sequential memory means. In return, the controller means sends the peripheral processor a sequential memory read control signal via the sense field signaling the peripheral processor that the controller means is reading the sequential memory means.

State machine means called by the controller means is arranged to transfer a first byte of the data message from the sequential memory means to temporary memory means. The state machine means accepts all additional characters from the sequential memory means and stores the characters in the temporary memory means until a character sequence is received indicating the end of data message. An analysis means is then called by the controller means which analyzes the received data message to ascertain the messages destination.

Sending means connected to the attendant console and to the controller means is disposed to receive the data message from the temporary memory means one byte at a time. The sending means than transmits the byte to the attendant console and signals the controller means that it is ready to send another byte. This operation is repeated until all of the message bytes have been transmitted.

The transmission of the data messages is completed by the controller means resetting the sequential memory read control signal in response to the peripheral processor resetting the data available signal. This signals the peripheral processor that the last data message has been transmitted.

A BRIEF DESCRIPTION OF THE DRAWINGS

A better understanding of the invention may be had from the consideration of the following detailed description taken in conjunction with the accompanying drawings in which:

FIG. 1 is block diagram of a CENTREX network system embodying the present invention.

FIG. 2 is block diagram showing the linking paths of the present invention interface the attendant console and the CENTREX network system.

FIG. 6 is a flow chart diagram illustrating the transfer operation between the attendant console and the CENTREX network system of the present invention.

FIG. 7 is a chart showing the operation of the STATE machine.

DESCRIPTION OF THE PREFERRED EMBODIMENT

Figure 3:
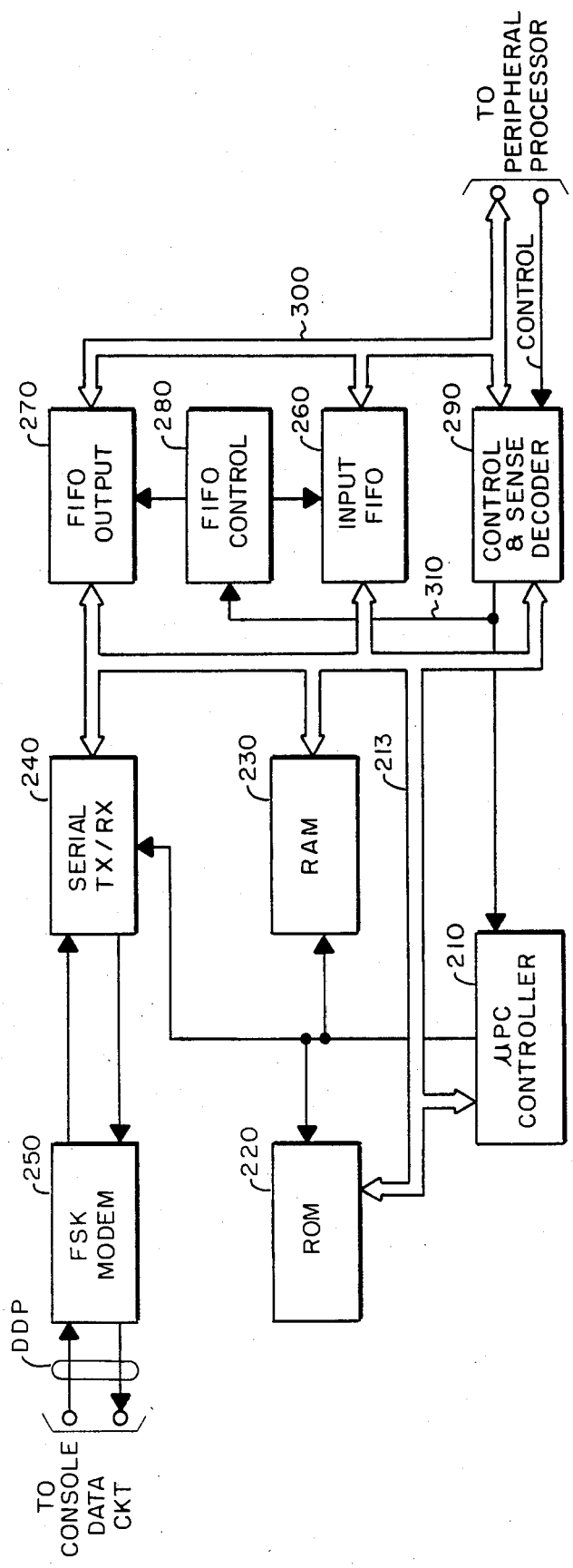
FIG. 3 is a block diagram of the digital line interface.

Referring to FIG. 1, a time-space-time digital switching system having a central exchange or CENTREX feature is shown. As a standard central office exchange telephone instruments A and B are connected to the network switching system via analog subscriber lines 1 and 2 to an analog line unit 13. The analog data received is converted to Pulse Code Modulated (PCM) digital signals for output to the next network stage. Analog line unit 13 is connected to analog control unit 14. Originating time switch 20 is connected to a space switch unit 30, which in turn is connected to a terminating time switch 21. Terminating time switch 21 is connected to analog control unit 14 and finally back to analog line unit 13 where the PCM digital signals are converted to analog signals and transmitted down subscriber lines 1 and 2.

Terminating time switch 20 is further connected to analog control unit 17, analog trunk unit 18 and trunks 3 and 4. Analog trunk unit 18 can be dedicated exclusively for CENTREX use. The trunk unit 18 connects the CENTREX customers subscriber instruments to the network system.

The Console Interface Circuit (CONI) 19 of the present invention is connected to a duplex pair of an analog control unit 17 and provides the means by which system commands, display messages and attendant console keycodes are transferred between the attendant console 5 and the CENTREX network system. The operation of the CONI circuit is transparent to both the system and the attendant console. Communication between CONI 19 and console 5 is via a digital data path 15 and an analog talk path 11.

Turning now to FIG. 2, a block diagram illustrating the interface of the attendant console to the CENTREX system is shown. The CONI interfaces the attendant console 5 and CENTREX system via two distinct communication links. In the first link, all analog signals are interfaced from the console handset 116, via voice transmission circuit 116 and analog talk path (ATP) to the analog interface 117 in the CONI 19. The analog signals are converted in the analog interface 117 into pulse code modulated (PCM) signals and transmitted to the originating time stage 20 of the CENTREX network via PCM path PCMX.

Likewise, analog information destined for the attendant console 5, is applied in PCM form to PCM path PCMX from the terminating time stage 21. The PCM information is converted into analog information by the analog interface 117 of CONI 19 and sent to handset 116 through the ATP and voice circuit 115. This communication link forms the talking path between the console 5, the CONI 19 and the network system of the CENTREX.

The data link between the console 5 and the CONI 19 is routed from a keyboard via a console data circuit 121 and a 4 wire full duplex data link (DDL) to the digital interface 122. Data input by the console operator is converted by the data circuit 121 into asynchronous data messages comprising 1 start bit, 7 data bits, an even parity bit and a stop bit. The data messages are transmitted over the DDL via a 1200 baud Frequency Shift Key (FSK) modem located in data circuit 121. The data transmitted by the console is received by the CONI 19 digital interface 122, converted into 8-bit data bytes and is processed by the CONI. The data is passed on to the network via ACU 17 to the peripheral processor 70 if no action is required by the CONI. The CONI thereby assumes a "transparent" front to the CENTREX network system and functions as a transaction exchange medium. Alternatively, in certain cases keycodes and command codes received by the CONI are acted upon and responded to by the CONI.

Data from the peripheral processor 70 in the form of command codes is transmitted to the CONI digital interface 122. Again if the data is destined only for the console the CONI formats the data into FSK asynchronous data messages and transmits the messages over the 1200 baud DDL to the console data circuit 5. The data is interpreted by the console and the appropriate display device 119 activated, i.e. LEDs turn on or off, a message displayed, the display cleared, or an audible alarm turned on or off.

Turning now to FIG. 3, a detailed explanation of the CONI digital interface will be given.

The CONI interface of the present invention is comprised of the following Large Scale Integrated (LSI) devices. A controller portion includes a microprocessor 210 connected to a Read Only Memory (ROM) 220 and Random Access Memory (RAM) 230 through an address/data bus 213. The ROM circuit 220 stores the operating system used by the microprocessor 210 which controls the operation of the CONI interface. The RAM is used as a temporary storage area for the message bytes received by the CONI. This controller portion of the CONI interface is connected to the console 5 via a serial Transmitter/Receiver (Tx/Rx) 240 and a Frequency Shift Key (FSK) modem chip 250.

The serial Tx/Rx is a LSI Universal Serial Asynchronous Receiver Transmitter (USART) such as the Intel 8259. This device under control of the microprocessor translates the 8 data bits sent to the USART on the address/data bus into the asynchronous serial data words described earlier. The FSK modem translates the data into audio tones for the transmission of the data down a twisted pair transmission path.

The connection between the CONI interface and the peripheral processor is accomplished via a pair of 64×4 First In First Out (FIFO) circuits. An input FIFO 260 and an output FIFO 270 each have one side of the FIFOs connected to address/data bus 300 which extends from the peripheral processor. Each FIFO is further connected to the CONI data bus 213. A control and sense decoder 290 is also connected to the peripheral processor address/data bus 300 and CONI address/data bus 213. The control and sense decoder interprets control words sent by the peripheral processor detailing the type of messages sent to the CONI and any special handling required. The control and sense decoder 290 also communicates to the microprocessor and a FIFO control circuit 280 via control lead 310.

As explained earlier and shown on FIG. 2 the CONI also includes an audio interface for transmitting analog voice signals between the console 5 and CENTREX network system and CENTREX network system to the console 5. The analog interface between the console 5 and the CONI consists of a single tip and ring voice pair (T and R). On this analog pair voice conversations and DTMF tones are transmitted. The system provides the talk battery on the tip and ring leads which also powers the DTMF generator in the console. The console 5 contains a standard network interface.

Figure 4:
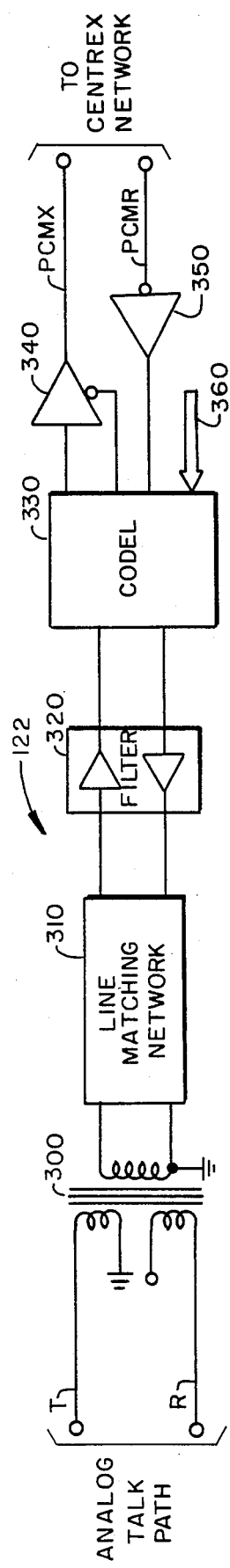
FIG. 4 is a block diagram of the analog line interface.

Turning now to FIG. 4, the analog interface of the CONI is illustrated. The interface 122 includes a two to four wire hybrid coil 300, a line matching network 310 in the form of an electrical hybrid, a transmit and receive amplifier and filter comprised of an INTEL 2912 filter and an INTEL 2910 CODEC (COder/DECoder). The hybrid coil 300 interfaces directly to the line matching network 310. The line matching network includes the necessary components for two balancing networks. This allows the use of −5 volt non-loaded lines or +12 volt loaded lines. The line matching network 310 is connected via lines TX and RX to filter network 320. The TX line connects to a transmit filter in the filter 320 as does the RX line to a receive filter. The filters also have provisions for adding the necessary gain in both the transmit and receive paths. The filter 320 is further connected via lines TX and RX to the CODEC 2910. The output of the transmit filter drives the analog input of CODEC 330. The CODECs primary function is to encode an analog signal into a 8 bit PCM word which is then sent to the network in the proper channel via driver 340 and the PCM transmit bus PCMX.

Similarly, the CODEC 330 will clock in information from the receive PCM bus PCMR and driver 350 during its assigned channel. The binary signal is then decoded into PAM (pulse amplitude modulated) signals by the CODEC and converted into an analog signal by the receive filter of filter 320. The analog signal is then applied to the console via the line matching network and the T and R leads of the hybrid coil 300. Controls signals 360 connected to the peripheral processor allows the CODEC to be programmed to operate in a specific manner i.e. transmit and receive, transmit only or operate within a specific time slot.

It should be noted since the CONI analog interface and digital interface use two distinct communication links to transmit information between the console 5 and the CENTREX network system the analog talk path and the duplex data path may be used simultaneously in transmission and reception of analog and digital data.

Before a detailed explanation of the CONI circuit is given it is believed an understanding of the message structure transmitted between the console and the CENTREX system will be helpful. The messages that are transmitted between the CONI console 5 and the CENTREX system are in an ASCII field format. All characters including numbers are transmitted as ASCII characters. The field format consists of command and data fields strung together to form a command string. This command string is treated as a single message by the console 5 or the CENTREX system. Command and data fields are separated by a "CARRIAGE RETURN" (CR). A message is terminated by a null field which is in this case a double "CARRIAGE RETURN". There is no set field length, but the maximum message length is 64 characters. Each message from the system is followed by a complementary checksum. A checksum is sent with each keycode message transmitted by console 5 or each command code transmitted by the CENTREX. The following are examples of valid command strings:

A 3 field command sent from the system to the console.
XX:MM:DDDDDDDD::C
A 2 field response sent from the console to the system.
XX:DDDDDDDD::C
In the above examples:
X = command code or keycode.
M = command code modifier.
D = command code data.
C = checksum
:= "CARRIAGE RETURN" field delimiter.

All command codes, keycodes, modifiers and data are in a 7 bit ASCII format. The checksum is a 2's complement of the entire command message including the carriage return field delimiters.

Normally the data messages will carry keycodes to the CENTREX system from the console 5 or command codes from the CENTREX system to the console 5.

Figure 5:
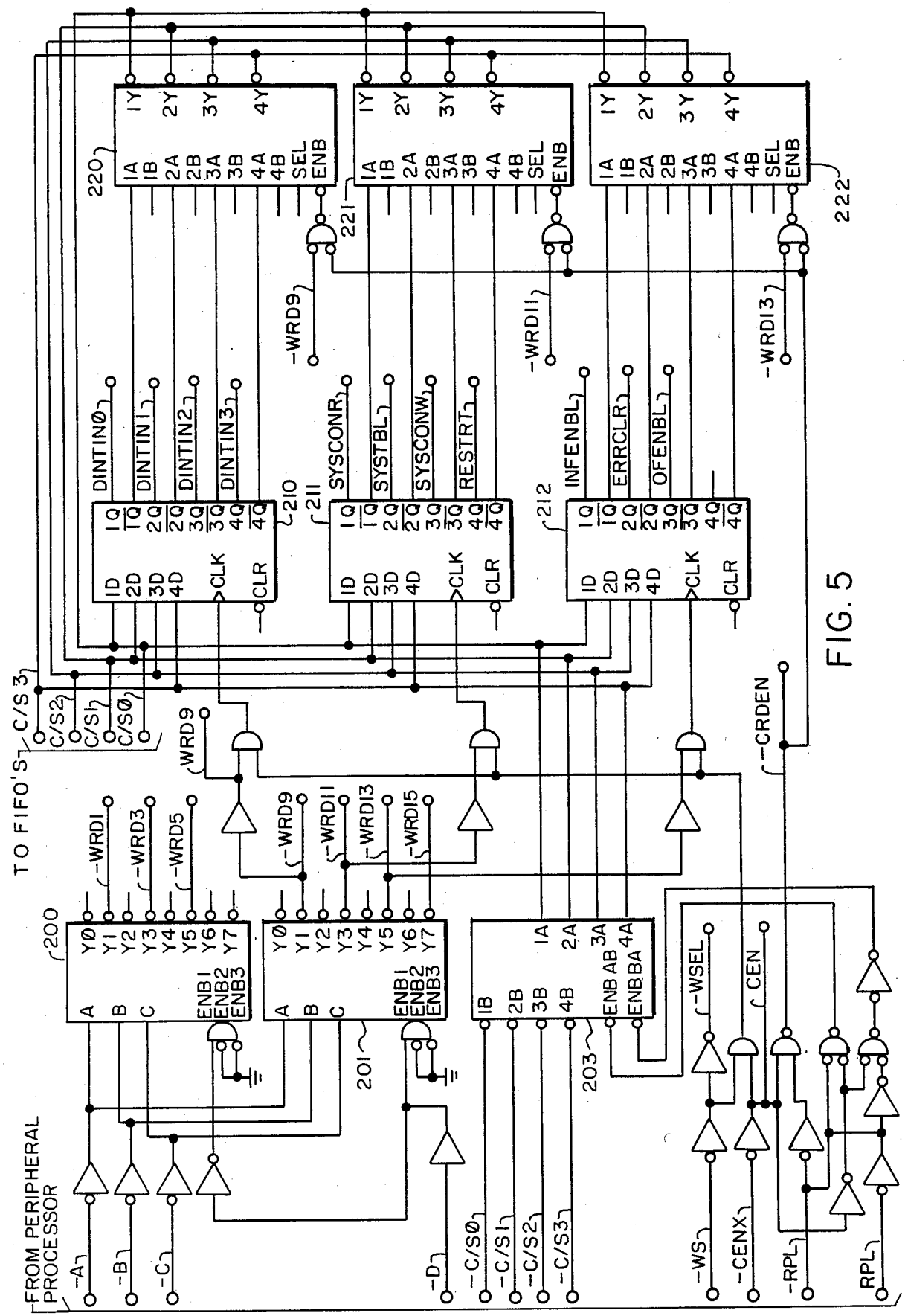
FIG. 5 is schematic of the Control and Sense Decoder shown at FIG. 3.

The CONI interface circuit communicates to the console and to the CENTREX network system by accepting information from one end and transferring that information to the other. In order for this to be accomplished in the most expedient manner, the CONI uses priority structure to decide which action to take. The priority is as follows:
PRIORITY 1—highest—console incoming data to CONI
PRIORITY 2 console outgoing data from CONI
PRIORITY 3 CONI data from the network
PRIORITY 4—lowest—CONI data to the network Turning now to FIG. 5, a detailed schematic of the control and sense decoder 290 is shown.

The control and sense decoder interfaces the CONI and CENTREX peripheral processor. The circuit is comprised of control point decoders 200 and 201, data transceiver 203, flip-flops 210–212 and data selectors 220–222. In addition, a number of logic gates are used to provide decoding of various read, write and enable control signals.

Decoders 201 and 202 have their inputs connected to the analog control unit (ACU) 17 which is connected to the peripheral processor 70. In all cases the CONI communicates to the peripheral processor 70 via a control and sense field of ACU 17. Decoder inputs −A − −D are address leads which specify a control point or sense point type. For example, a binary "1" (0001) sent to decoders 201 and 202 is interpreted as a WORD 1 control point, setting the decoder 200 output lead labeled −WRD1. As can be seen there are 7 output control words and therefore decoders 200, 201 recognize 7 control points. The control words will be identified later in the explanation of the operation of the CONI. The ACU 17 is further connected to the control sense decoder 290 via a bidirectional data control and sense bus C/S0−C/S3. Message data as well as other control data such as ERROR words are passed between the CONI and the peripheral processor via this bidirectional bus. Finally, write control signals, −WS, −WSEL, read control signals −RPL, RPL and enabling signals −CENX, CEN are input from ACU 17 and decoded and used to write, read and enable the control words and data being transferred between the CONI and the peripheral processor 70.

Turning now to FIG. 6 of the included drawings the operating unit for handling command codes will now be explained.

This operating unit is entered by the application of the control point SYSCONW by the peripheral processor to the CONI via control and sense decoder 290. This signal interrupts the microprocessor 210 indicating that a command code message has been loaded into the input FIFO 260. The CONI then sets control signal CONSYSW signaling the peripheral processor that the CONI is accessing the input FIFO 260. The command code message is then transferred out of the input FIFO a nibble at a time, (most significant 4-bits first) and reassembles the message into an 8-bit byte into a buffer in RAM 230. The CONI then enters the following STATE machine. The state changes are based on the reception of the "CARRIAGE RETURN" (CR) character.

With reference to FIG. 7 an explanation of the STATE machine will now be given.

STATE 0 is the beginning of a command code message. The first byte in the command code message is entered into a buffer in RAM 230. The state is then changed to STATE 1 and the routine reenters the state machine.

STATE 1 looks at the received character. If the character is a "CARRIAGE RETURN", the state is changed STATE 2 and the character is stored in the buffer. If the character is not a "CARRIAGE RETURN", the character is stored in the buffer and the state remains in STATE 1 and the routine reenters the STATE machine.

STATE 2 stores the received character in the buffer and determines if it is a "CARRIAGE RETURN", (the second carriage return that would signify the null field or end of message). If it is a "CARRIAGE RETURN" than the state is changed to STATE 3 otherwise the state is changed to STATE 1 and the routine reenters the state machine.

STATE 3 accepts the character (which is the checksum byte) and compares it to the calculated checksum for the message. If it does not compare, the state is changed to STATE 0, all the variables are cleared and the CONI sets control signal CONTBL indicating to the system that the received message was invalid. If the checksum compares the state is changed to STATE 4.

After the complete message has been received and stored in a buffer in RAM 230 the CONI performs an analysis on the message to determine the message destination, i.e. if the message is for the console 5 or for the CONI. The message that the CONI acts on are as follows:

INITIATE PHASE 2—This command causes the CONI to enter a self-diagnostic mode where the CONI echoes whatever is placed on its control points, back on the sense points. This routine tests the control and sense decoder 290.

EXECUTE PHASE 3—This command causes the CONI to take the data within a received message and change the command code from a command code to a keycode indicating a maintenance response. It then recalculates a new checksum and puts the new message into the output FIFO for transmission to the peripheral processor.

All other command code messages are passed to the attendant console 5. The command code messages are sent in sequence, based on an ACKNOWLEDGE keycode sent by the console 5.

The CONI will then transfer the message to the serial TX/RX 240 one byte at a time for transmission to the attendant console 5. The CONI then determines if the peripheral processor has reset SYSCONW. If SYSCONW has been reset, CONI will reset CONSYSW which is passed to the peripheral processor via bus field C/S0-CS3 of FIG. 5. This flags the peripheral processor that another message can be loaded into input FIFO 260.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. An operating unit for an interface circuit for transmitting data messages between a CENTREX equipped central office exchange and a remotely located attendant console, the central office exchange including an analog control unit connected to a peripheral processor, said analog control unit including a control field for sending control signals to said interface circuit, and a sense field for receiving control signals from said interface circuit and sending data messages to said interface circuit, said operating unit comprising:

sequential memory means connected to said sense field and to controller means, said sequential memory means arranged to receive and store a data message from said peripheral processor, and said peripheral processor arranged to send a data available signal to said controller means via said control field signaling that a data message is available for transfer from said sequential memory means, and said controller means sends said peripheral processor a sequential memory read control signal via said sense field signaling the peripheral processor that the controller means is reading said sequential memory means;

state machine means called by said controller means arranged to transfer a first byte of said data message from said sequential memory means to temporary memory means, said state machine means accepting all additional characters from said sequential memory means and storing said characters in said temporary memory means until a character sequence is received indicating an end of data message;

analysis means called by said controller means for analyzing said received data message to ascertain the destination of said received data message; and sending means connected to said attendant console and to said controller means, said sending means arranged to receive said data message from said temporary memory means one byte at a time sending said byte to said attendant console, said sending means arranged to send a signal to said controller means each time it is ready to send another byte until the data message has been transmitted whereby, in response to said peripheral processor resetting said data available signal, said controller means resets said sequential memory read control signal, signaling said peripheral processor that the data message has been transmitted.

2. The operating unit for an interface circuit as claimed in claim 1, wherein: said receiving means is a Universal Serial Asynchronous Receiver Transmitter (USART) and said send signal is a transmitter ready control signal output by said USART when all characters have been output from a USART transmit data register.

3. The operating unit for an interface circuit as claimed in claim 1, wherein: said controller means is a microprocessor controller connected to a Read Only Memory (ROM) said ROM stores said operating unit allowing said microprocessor controller to execute said operating unit when called by said microprocessor controller.

4. The operating unit for an interface circuit as claimed in claim 3, wherein: said temporary memory means is a Random Access Memory (RAM) connected to said microprocessor controller arranged to store said data message in a byte format.

5. The operating unit for an interface circuit as claimed in claim 1, wherein: said data message includes a checksum bit following said end of data character sequence and said controller means calculates a checksum from the received characters of said data message and compares said checksum bit to said calculated checksum and responsive, to a comparison accepts the data message and calls said analysis means.

6. The operating unit for an interface circuit as claimed in claim 5, wherein: responsive to the calculated checksum not comparing to the data message checksum said controller means resets said interface circuit and sends said peripheral processor a send again data message.

7. The operating unit for an interface circuit as claimed in claim 1, wherein: wherein said end of data sequence comprises two "CARRIAGE RETURN" characters.

8. The operating unit for an interface circuit as claimed in claim 1, wherein: responsive to said analysis means ascertaining that the data message is for the interface unit said controller means calls diagnostic routines.

9. The operating unit for an interface circuit as claimed in claim 1, wherein: said sequential memory means is a First In First Out (FIFO) memory and said peripheral processor transfers said data message into said FIFO a nibble (4-bits) at a time with the most significant nibble first.

10. The operating unit for an interface circuit as claimed in claim 9, wherein: said controller means receives said nibbles and reassembles said nibbles into a byte format and calls said state machine means whereby, said controller means sends to said temporary memory means data bytes.

* * * * *